No. 633,774. Patented Sept. 26, 1899.
T. VON ZWEIGBERGK.
BEARING.
(Application filed Jan. 23, 1899.)
(No Model.)
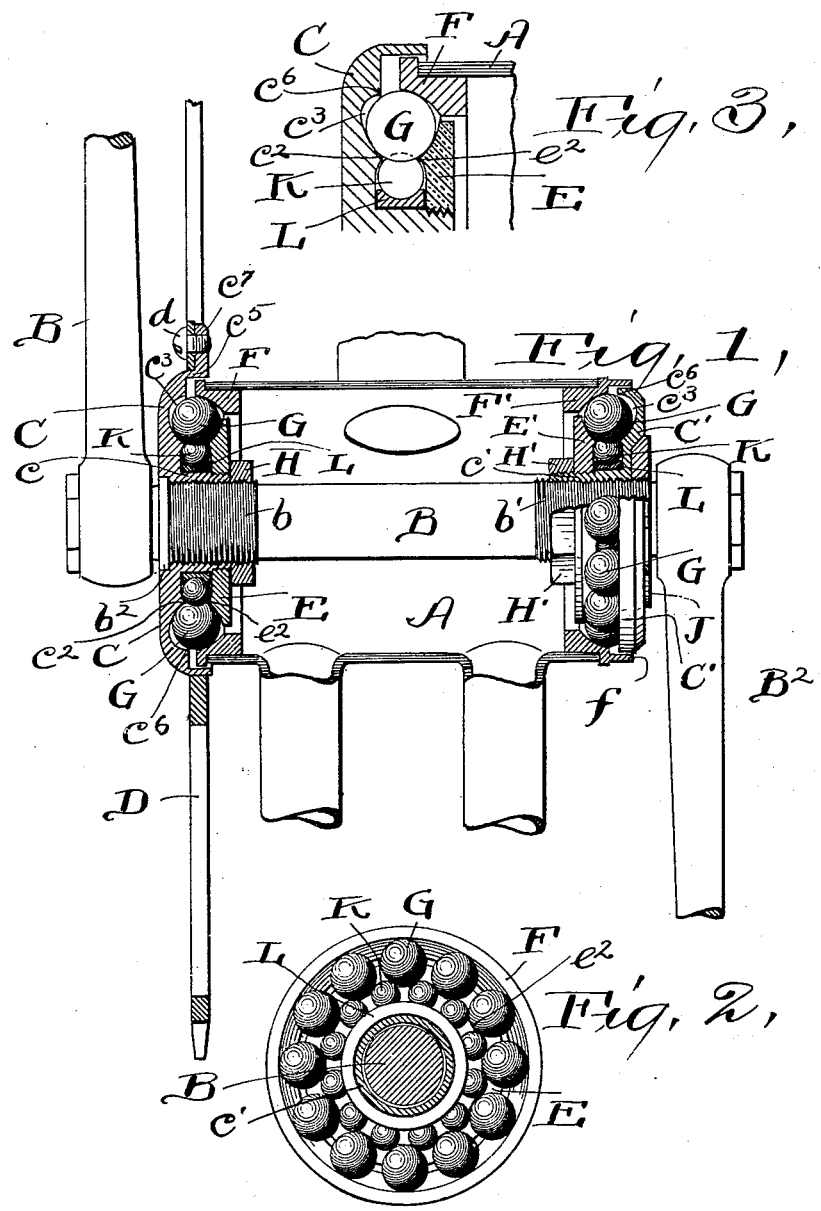

UNITED STATES PATENT OFFICE.

THORSTEN VON ZWEIGBERGK, OF CLEVELAND, OHIO.

BEARING.

SPECIFICATION forming part of Letters Patent No. 633,774, dated September 26, 1899.

Application filed January 23, 1899. Serial No. 703,030. (No model.)

*To all whom it may concern:*

Be it known that I, THORSTEN VON ZWEIGBERGK, a subject of the King of Sweden and Norway, residing at Cleveland, in the county of Cuyahoga and State of Ohio, have invented a certain new and useful Improvement in Bearings, of which the following is a full, clear, and exact description, reference being had to the accompanying drawings.

The object of my invention is to provide in a simple and efficient form a ball-bearing for bicycles. I provide a three-point bearing; and the invention is particularly concerned in the combinations of parts by which it may be adjusted and the means for retaining the balls when parts of the bearing are removed and in such disposition of the parts that a second set of rolling members, keeping the main balls separate, may be conveniently employed.

The drawings clearly illustrate my invention.

Figure 1 is a vertical central section through a hanger of a bicycle provided with my bearing. Fig. 2 is a sectional end elevation of the same, the section cutting through the shaft and the hub of the sprocket-support. Fig. 3 is a view illustrating the overlapping of the balls and the arrangement of their races, being a fragmentary enlargement of similar parts shown in Fig. 1.

Referring to the parts by letters, A represents the crank-hanger, carrying at each end the ball-cups F and F'. Within the crank-hanger is the crank-shaft B, to the ends of which are secured the crank-arms B' B². Screwing onto threads $b$ and $b'$ on the shaft by means of threaded hubs $c$ $c'$ are the plates C and C', which have grooves $c^3$, constituting part of the main ball-race. The plate C at the sprocket end of the hanger abuts against the rigid flange $b^2$ on the shaft, and this plate acts as the hub or spider of the sprocket or driving gear D, which may be secured to the plate by screws $d$, taking into ears $c^7$ on the plate. Screwing into the hub $c$ $c'$ of the plates C C' are the cones E E'. These cones complete the three-point raceways, which are bounded by the cones, the plates C C', and the ball-cups F F', and confine the balls G. The outer walls of the grooves $c^3$ do not touch the balls G, but come close to them, as shown at $c^6$, and this edge $c^6$ is distant from the cone when the parts are in place a shorter space than the diameter of the balls. Thus the balls may be retained in their races when the bearing is separated.

At the sprocket end the jam-nut H, screwing onto the shaft B, locks the plate C tightly in place, and also the cone E, which is turned back tightly against the nut. At the other end of the shaft the cone E' is locked by a jam-nut H', screwing onto the hub $c'$. This enables the plate C' and the cone E' to be turned as a unit from the outside (as by a spanner-wrench taking into recesses in the plate C') to finally adjust the bearing. This adjustment having been made, the plate C' is locked by the external jam-nut J. The cup F' has a flange $f$, extending over the plate C' to form a dust-cap, while at the other end the plate C has the flange $c^5$, extending over the cup for a similar purpose.

The balls G, which roll between the cone, cup, and plate, as stated, are separated from each other by smaller balls K, which are confined by the plate C or C' and the cone E or E' within their own raceway, but project into the main raceway sufficiently to prevent the balls G therein from contacting with each other. The balls K roll around the surface of a grooved ring L, which is quite loose on the hub of the plate, being loosely confined by the plate and cone. Now as the balls G revolve they cause the balls K to revolve; but while the proximate faces of the balls G are moving in the opposite direction (so that if these balls contacted they would grind upon each other) they both tend to give the balls K the same rotation, and therefore the balls G and the balls K simply roll and there is no rubbing of one upon the other. The ring L is caused by the balls K to rotate; but the friction of that ring with the containing parts is insignificant, for it receives none of the thrust on the bearing, which is carried by the main balls G and the members composing the main ball-race and is held in equilibrium by the equal inward pressure of the balls K. These balls K are maintained equidistant by the balls G, and if there were no play in the bearing the ring L could be actually out of contact with its containing members, being held concentric with the main ball-race by the two sets of balls. In order, however, that the balls K shall remain in their races if there is considerable play, I choke the entrance to that race by bringing the plate and cone closer together than the diameter of the balls beyond the center of the latter, as indicated by the reference-letters $c^2$ $e^2$.

It will be observed that the form of bearing shown is operative and advantageous without the separating balls and their rings, the weight upon the bearing being supported entire independently thereof; but the addition of these separating balls and rings operates to reduce the friction and wear by preventing the supporting rolling members from contacting with each other.

Having described my invention, I claim—

1. In a bearing, in combination, a shaft, a grooved plate having a hub surrounding and secured to said shaft, an adjustable cone screwing onto said hub, a ring loosely surrounding the hub and loosely confined between the plate and cone, a set of rolling members surrounding said ring and contained between the plate and cone, a ball-cup, and a set of balls rolling between said cup and the grooved plate and the cone and separated from each other by the said rolling members, substantially as described.

2. In a bicycle, in combination, a hanger, a ball-cup carried thereby, a shaft within the cup, a grooved plate having a hub screwing onto said shaft, an adjustable cone screwing onto the hub of the plate, a jam-nut locking said adjustable cone, a ring loosely surrounding the hub between the plate and cone, a set of rolling members surrounding said ring and contained between the plate and the cone, a set of balls rolling between the ball-cup and the grooved plate and the cone and separated from each other by the said set of rolling members, substantially as described.

3. In a bicycle, in combination, a hanger, a ball-cup carried thereby, a shaft within the cup, a plate secured to said shaft by having a hub screwing onto the same, a cone screwing onto said hub, a three-point raceway being thus provided by the plate the ball-cup and the cone, and balls rolling in said raceway, substantially as described.

4. In a bicycle, in combination, a hanger, a ball-cup carried thereby, a shaft within the cup, a grooved plate secured to said shaft, a cone carried by the shaft, there being thus provided a three-point raceway by the ball-cup, the plate and the cone, and balls rolling in said raceway, the outer wall of the groove in the plate standing when the parts are in position a less distance from the cone than is the diameter of a ball whereby the balls may be retained within the raceway if the shaft, plate and cone are removed from the hanger, substantially as described.

In testimony whereof I hereunto affix my signature in the presence of two witnesses.

THORSTEN VON ZWEIGBERGK.

Witnesses:
  E. B. GILCHRIST,
  ALBERT H. BATES.